United States Patent [19]
Miyamoto et al.

[11] Patent Number: 5,518,678
[45] Date of Patent: May 21, 1996

[54] ADSORPTIVE HONEYCOMB-SHAPED CERAMIC STRUCTURE AND METHOD FOR ITS PRODUCTION

[75] Inventors: Hiroki Miyamoto, Nara; Michinosuke Ohta, Sakai; Kanzo Ishikawa, Sanda; Yoshihiko Sukeda; Mitsunari Kaji, both of Takarazuka, all of Japan

[73] Assignees: Kawata Manufacturing Co., Ltd.; Osaka Prefecture, both of Osaka, Japan

[21] Appl. No.: 457,780

[22] Filed: Jun. 1, 1995

Related U.S. Application Data

[62] Division of Ser. No. 186,621, Jan. 26, 1994.

[51] Int. Cl.$^6$ ........................................ B32B 3/12
[52] U.S. Cl. .................. 264/177.12; 428/116; 428/188
[58] Field of Search .............................. 428/116, 118, 428/178, 188; 502/527; 264/177.12, 514

[56] References Cited

U.S. PATENT DOCUMENTS

| | | | |
|---|---|---|---|
| 4,886,769 | 12/1989 | Kuma et al. | 502/527 X |
| 5,232,973 | 8/1993 | Sakashita et al. | 524/444 X |
| 5,356,852 | 10/1994 | DeLiso et al. | 502/527 X |

FOREIGN PATENT DOCUMENTS

| | | | |
|---|---|---|---|
| 63-242980 | 10/1988 | Japan | 428/188 |
| 5-23528 | 2/1993 | Japan | 428/188 |
| 5-146676 | 6/1993 | Japan | 428/188 |

*Primary Examiner*—Henry F. Epstein
*Attorney, Agent, or Firm*—Wenderoth, Lind & Ponack

[57] ABSTRACT

A honeycomb-shaped ceramic structure having dehumidifying capacity formed by extruding into a honeycomb shape a composition containing zeolite powder having moisture adsorbing property, inorganic fiber, and inorganic binder and by baking the composition in the honeycomb shape. The product displays an excellent dehumidifying capacity at a relatively high temperature of 50°–100° C. The honeycomb-shaped ceramic structure is produced by extruding the composition containing zeolite powder, inorganic fiber and inorganic binder into a honeycomb shape and by baking it at 400°–700° C. after drying.

5 Claims, 1 Drawing Sheet

ADSORPTIVE HONEYCOMB-SHAPED CERAMIC STRUCTURE AND METHOD FOR ITS PRODUCTION

This application is a division of pending application, Ser. No. 08/186,621, filed Jan. 26, 1994.

BACKGROUND OF THE INVENTION

1. Field of the Invention

The present invention generally relates to an adsorptive honeycomb-shaped ceramic structure and a method for its production, and particularly relates to a honeycomb-shaped ceramic structure having a rich adsorption property and favorably used as a drying agent which generates dry air for drying granules, as in a microwave drying apparatus for drying granules, and a method for its production.

2. Description of the Related Arts

Conventionally, there has been provided an apparatus to utilize hot wind in order to dry the powder granules containing water or a low boiling point solvent. Because it is inefficient to cool down the circulating air at a high temperature with such an apparatus, it is desirable that the air at a relatively high temperature of about 50°–100° C. be used and circulated in case of cooling. Accordingly, in order to generate such a dry air, a drying agent having a large moisture adsorbing capacity even in the above temperature range is desired.

As a method for generating the dry air, there is one employing a plurality of rotors respectively filled with granular drying agent according to the purpose of the air used, while, as another method for generating the dry air, there is one employing a honeycomb columnar rotor as drying agent having a honeycomb-like structure, and the latter method is considered more convenient. According to this latter method, while the rotor is rotated at a slow speed of 3–10 times an hour, air is passed therein to have the rotor adsorb moisture to obtain dehumidified air. According to the honeycomb rotor system, the columnar honeycomb rotor is divided into three angular regions: the first region through which the air to be dried is passed; the second region through which heated air (hot wind) is passed to heat and dehumidify the drying agent, i.e. rotor itself, which have absorbed moisture in the first region; and the third region through which cold air is passed to cool the drying agent, i.e. rotor itself, which revived in the second region, thereby carrying out a cycle of dehumidifying the air, reviving the drying agent, i.e. rotor itself, and the cooling the agent, repeatedly. This method has an advantage of allowing the drying agent to revive easily and of being able to get stabilized dry air without unstableness in dehumidifying.

As to the drying agent to be used for these dryers, silica gel or zeolite is well known. Silica gel has a satisfactory moisture adsorption capacity at a low temperature, while it has an insufficient moisture adsorption capacity at a relatively high temperature. Further, in case of lowering the temperature of the dry air generated in the dryer so as to improve the moisture adsorption property of silica gel by using water, it is almost impossible to cool it down below 35° C. in summer season, and the silica gel does not exhibit its adsorption capacity sufficiently at the temperature. Accordingly, silica gel does not meet the condition required as a drying agent in use for a drying apparatus employing the microwave heating.

On the other hand, as zeolite (molecular sieve) has an excellent moisture adsorption capacity at a relatively high temperature, it is useful as a drying agent for a dryer utilizing microwave heating. However, it has problems in processability; accordingly, normally it is used in a granular form. In this case, as the adjacent portions between the zeolite particles do not necessarily constitute the effective adsorption surface area as a drying agent, the effective surface area is not sufficient. Accordingly, it is desired to make the effective surface area larger in order to improve dehumidifying capacity.

As a drying agent improved so as to make the effective adsorption surface area of zeolite larger, there is known a drying agent comprising a structure of a ceramic sheet, formed in honeycomb shape, with coating of zeolite powder, which is used as a honeycomb rotor. However, this drying agent has several defects as follows. Firstly, it is difficult to produce it due to its distinctiveness that the ceramic sheet is processed into a corrugated board by a special treatment such as a corrugate processing, and then the zeolite powder is coated on the surface of the honeycomb structure formed into a roll shape by winding a ceramic sheet. Second, its cost is high. Third, if it is the type of dryer employing the honeycomb rotor, reviving the drying agent, i.e. the honeycomb rotor itself, by hot air at about 200° to 250° C. and cooling down the revived drying agent to a room temperature by air are carried out repeatedly. However, if this cycle continues, there arise such problems as the zeolite falling off the surface of the ceramic sheet, or degradation thereof by thermal impact or the like, leading to lowering of durability as a drying agent.

In addition to the abovementioned drying agent, as honeycomb-shaped ceramic structures, there are known a honeycomb structure of an extrusion molding product, a three-dimensional net-like structure (a spongy net), or a ceramic porous structure, having a multi-layer structure, made by regularly multi-laying linear extrusion product one above the other spirally (Japanese Laid-Open Patent (Unexamined) Publication No.242980/1988). This structure may be utilized for a filter of molten metal or catalyst carrier, but is not used as a drying agent. Heretofore, there has not been known any such drying agent made by extruding the composition containing zeolite powder into a honeycomb shape.

SUMMARY OF THE INVENTION

Accordingly, it is an object of the present invention to provide a drying agent having an excellent dehumidifying capacity at relatively high temperature by utilizing excellent moisture adsorption characteristics of zeolite, having a high durability against reviving itself by heating and against cooling it, repeatedly, and having a high strength as a structure.

Another object of the present invention is to provide a method for producing the above drying agent efficiently.

In order to attain the above objects, according to the present invention, there is provided a drying agent with the following construction, i.e., an adsorptive honeycomb-shaped ceramic structure, and a method for its production.

In other words, the adsorptive honeycomb-shaped ceramic structure is formed by extruding a composition including zeolite powder having a moisture adsorption characteristic, inorganic fiber and inorganic binder into a honeycomb form, and by baking it.

And, its production method comprises the steps of:
extruding a composition containing zeolite powder having a moisture adsorption characteristic, inorganic fiber, and inorganic binder into a honeycomb shape;

drying said extrusion molding product; and baking said dried extrusion molding product at a temperature between 400°–700° C. for at least 1 hour.

The honeycomb-shaped ceramic structure according to the present invention exhibits an excellent dehumidifying capacity at a relatively high temperature between 50°–100° C. by extruding the composition containing zeolite powder as an essential component having an excellent moisture adsorbing property at those temperatures into a honeycomb structure having a large surface area. Further, when it is used as a drying agent, it shows the following effects: 1) pressure loss of the passed air is low; 2) in proportion to the large internal surface area, the adsorption rate is large and the heat exchange efficiency in reproducing the adsorption capacity is large; 3) there is scarce weathering under effect of the flow of liquid or gas; 4) due to the extrusion molding at a high pressure, the strength of the zeolite layer is high; 5) the product is especially strong to thermal stress; and the like.

Further, according to the method of the present invention, it is possible to easily produce an adsorptive honeycomb-shaped ceramic structure, at a low cost, which has such an adsorption capacity and which can be easily installed in the drying apparatus or the like.

Zeolite used in the present invention may be any of natural or synthetic ones, and commercially available products such as molecular sieve or those having various compositions which are widely used in the petrochemical field can be utilized without specific limitation. Among the commercially available products, one sold under the trade mark of SILTON B (made by Mizusawa Chemical Co.) is preferable. In the present invention, such zeolite is used in a form of powder having an average particle size of 0.3–5 μm.

To the structure of the zeolite-containing composition to be used in the present invention is imparted moderate strength by adding an inorganic fiber as a supporting material for zeolite. As the inorganic fiber, there may be used ceramic fibers such as sepiolite fiber, glass fiber, alumina fiber, alumina-silica fiber, silica fiber, etc., among which the sepiolite fiber is preferably used. As a fiber length of the inorganic fiber, 0.001–2 mm is suitable, and as a fiber diameter, 0.01–1 μm is suitable.

Further, the above composition is allowed to contain an inorganic binder so as to impart a moderate molding property to it, and through said binder the zeolite powder and inorganic fiber are suitably dispersed and retained in the molding product. As the inorganic binder, colloidal silica, alumina sol, ethyl silicate, silica gel, zirconia sol, and the like. Among them, colloidal silica is preferably used.

Preferred rates of these components are 30–87 wt. % of zeolite, 10–30 wt. % of inorganic fiber, and 3–10 wt. % of inorganic binder, in solid contents.

As other components, an organic binder such as polyvinyl alcohol (PVA), methyl cellulose (MC), carboxymethyl cellulose (CMC), starch, etc. may be used if necessary. The organic binder is eliminated by decomposition in the later-described baking process.

The method of the present invention, designed to produce the above adsorptive honeycomb-shaped ceramic structure, comprises a step of preparing a composition containing each component as mentioned above, a step of extruding the composition, a step of drying the molding product, and a step of baking the dried molding product at 400°–700° C. for at least 1 hour. The method according to the present invention basically comprises the simple steps of extrusion molding and baking, and has the characteristics that the process is extremely simple and can be performed at low cost in comparison with the conventional drying agent comprising the ceramic sheet deposited with zeolite powder.

The composition to be used in the present invention contains zeolite powder, inorganic fiber such as sepiolite, and inorganic binder such as colloidal silica. In order to obtain good extrusion products, water and organic binder such as polyvinyl alcohol, etc. may be appropriately added if necessary.

In the present invention, the method for extruding the composition is not specifically limited. The abovementioned composition is charged in an extrusion molding machine having an extrusion die (mouthpiece) with a desired shape, and it is extruded at a rate of preferably about 20–200 cm/min. to get the molding product.

Drying is made by natural drying at room temperature for about 24 hours. Drying may be made by heating it up to about 40°–80° C. with a microwave heating apparatus or the like.

Baking is preferably carried out at a temperature of 400°–700° C. which does not deteriorate the zeolite adsorption characteristic, more preferably at a temperature of 500°–600° C., for at least 1 hour.

The adsorptive honeycomb-shaped ceramic structure thus obtained has a structure in which zeolite powder and the inorganic fiber are moderately dispersed and retained through the inorganic binder, by which the adsorption surface area of zeolite is improved and its excellent moisture adsorption characteristics are sufficiently displayed.

In the present invention, the shape and size of the adsorptive honeycomb-shaped ceramic structure can be optionally selected according to the method of use as a drying agent. It is to be noted that, in the present specification, the term "honeycomb-shaped" includes not only the so-called honeycomb shaped (hexagonal) sectional openings but also square, triangular, and other polygonal or circular ones.

An example of the drying agent for honeycomb rotor is shown as in FIG. 1.

According to said example, the columnar adsorptive honeycomb-shaped ceramic structure 1, drying agent, has a sectional honeycomb structure constituted by a plurality of square holes 2 which extend in the direction of extrusion of the column so that the air freely passes the holes 2. This drying agent is set as a honeycomb rotor of the microwave dryer as mentioned above by the axial hole 3 at the central part, and a cycle of dehumidifying, reviving and cooling is repeatedly carried out. The shape and size of the holes 2 provided on the above ceramic structure 1 may be optionally selected. In this embodiment, the distance between the centers of the adjacent holes is set to be about 2 mm, and the thickness of the partition walls 4 constituting the hole 2 to be about 0.5 mm, but these values are of course not limitative. In FIG. 1, the holes 2 are shown to be enlarged for simplification of the explanation.

By the way, as a result of the strenuous review of various inorganic fibers other than the abovementioned sepiolite fiber, glass fiber, alumina fiber, alumina-silica fiber and silica fiber, the present inventors have succeeded in obtaining a honeycomb-shaped ceramic structure containing adsorptive zeolite which has an excellent adsorption property such as dehumidifying capacity, durability and strength as a structure.

The ceramic structure of the invention is produced by molding a composition containing:

(a) zeolite powder having adsorption characteristic, (b) at least one inorganic fiber selected from the group consisting of (i) non-oxide fiber selected from carbon fiber, silicon carbide fiber, boron carbide fiber and boron nitride fiber, (ii) oxide fiber selected from potassium titanate fiber, zirconia fiber and alumina-boronasilica fiber, and (iii) metal fiber selected from stainless steel fiber and steel fiber, and (c) an inorganic binder in a honeycomb shape, and baking it.

Further, the method for producing the ceramic structure of the invention comprises: extruding the composition containing the above components (a), (b) and (c), and if desired, an organic binder (d) into a honeycomb shape, drying the resulting extrusion-molding product, and then baking the resulting product at a temperature of 400°–700° C. for at least 20 minutes. Among the commercialized products, one marketed under the trade name of SILTON B (made by Mizusawa Chemical Co.) or the like is preferred.

In the present invention, such zeolite is used as the component (a). Zeolite is preferably used in powder form, especially in a form of zeolite powder of about 0.3–10 μm in average particle size.

The zeolite-containing composition to be used here is allowed to contain an inorganic fiber (b) as a reinforcing material for zeolite to give a moderate strength to the molding product. Here, the above inorganic fiber of the component (b) is selected from the group consisting of: (i) non-oxide fiber selected from carbon fiber, silicon carbide fiber, boron carbide fiber and boron nitride fiber, (ii) oxide fiber selected from potassium titanate fiber, zirconia fiber and alumina-borona-silica fiber, and (iii) metal fiber selected from stainless steel fiber and steel fiber. These inorganic fibers may be used either solely or in combination of two or more kinds. Among these inorganic fibers, especially carbon fiber is preferred.

As the carbon fiber, the fiber reinforced plastics (FRP) or the one used in general as a filler for fiber reinforced ceramics (FRC) may be utilized without specific limitation. As the concrete examples of such carbon fibers, there may be given, for example, pitch carbon fiber, rayon carbon fiber, polyacrylonitrile (PAN) carbon fiber, mesoface carbon fiber and gas phase growth carbon fiber, etc.

As these carbon fibers, there may be used a graphite having relatively high crystallinity and a carbonaceous fiber having relatively low crystallinity, and a whisker may be used. Further, there may be used the one reinforced by coating with other ceramics such as SiC coated carbon fiber.

The fiber length and fiber size of the above inorganic fiber differ by the kind and they cannot be generally specified. A fiber length of about 0.02–2 mm and a fiber diameter of about 0.1–20 μm are suitable.

The zeolite-containing composition may be allowed to contain an inorganic binder through which zeolite powder and inorganic fiber are adequately dispersed in the molding product and retained. Water or organic binder having plasticity may be mixed with the inorganic binder, according to necessity, to give moderate molding property to the zeolite-containing composition.

Here, as the inorganic binder, besides colloidal silica, alumina sol, ethyl silicate, silica sol, zirconia sol, there may be used sepiolite having rigid binding property, clay ore, etc.

Among these materials, those preferably used are (i) colloidal silica and sepiolite, (ii) colloidal silica and clay ore, (iii) colloidal silica, sepiolite and clay ore.

Here, as the clay ore, there may be given kaolin clay such as kaolinite, nakhlite, dickite, halloysite, etc. and montmorilonite clay such as montmorillonite, beidellite, nontronite, saponite, etc. Besides, illite clay may be used.

Further, the organic binder for the component (d) to be used according to desire may be polyvinyl alcohol (PVA), methyl cellulose (MC), carboxymethyl cellulose (CMC), starch, etc. These organic binders are decomposed and eliminated in the baking step described later.

In the present invention, the proportions of contents of the components are preferably as follows: component (a) (zeolite): 30–87 wt. %, component (b) (inorganic fiber): 0.5–5 wt. %, component (c) (inorganic binder): 15–45 wt. %. The content of the inorganic binder is more preferably 20–35 wt. %.

The proportion of the component (d) (organic binder) is preferably 0.5–10 wt. % based on 100 parts by weight (based on moisture content) of the total amount of (a) zeolite component, (b) inorganic fiber component and (c) inorganic binder component.

The method for producing the adsorptive zeolite-containing honeycomb-shaped ceramic structure of the present invention comprises a step of preparing the composition containing each component as mentioned above, a step of extruding the zeolite-containing composition, a step of drying the resulting molding product, and a step of baking the dried molding product at a temperature of 400°–700° C. for at least 20 minutes. The process of the present invention basically comprises simple operations of extrusion and baking, and it has characteristics that the process is extremely simple and is executable at a low cost.

In the present invention, the method for extruding the zeolite-containing composition is not specially limited. The abovementioned composition is charged to an extrusion molding machine having an extrusion die (mouthpiece) with a desired configuration and the content is extruded at a speed of preferably 20–1000 cm/min. to get the molding product.

Drying is made preferably by a microwave or by hot air to heat it up at 50°–100° C.

Firing is preferably performed at a temperature of 400°–700° C. which does not spoil the adsorptive property of zeolite, more preferably at a temperature of 500°–600° C., for at least 20 minutes.

The adsorptive zeolite-containing honeycomb-shaped ceramic structure thus obtained has a structure of zeolite powder and inorganic fiber being in moderate dispersion and retention through the inorganic binder, so that the adsorptive surface area of zeolite is improved and its excellent adsorptivity is sufficiently displayed.

While the adsorptive honeycomb-shaped ceramic structure according to the present invention is mainly designed to be used as a drying agent as described above, the structure is favorably applicable to various other uses, gas eliminating agent (elimination of carbon dioxide from air, elimination of oxygen from argon gas, elimination of nitrogen oxide in air, elimination of nitrogen oxide in nitrogen, etc.), gas separating agent (separation between oxygen and nitrogen, etc.), deodorizer, petroleum refining agent, water purifying agent, air cleaning agent, drainage treating agent, exhaust treating agent (catalyst), dewfall preventing agent, etc.

BRIEF DESCRIPTION OF THE DRAWING

These and other objects and features of the present invention will become clear from the following description taken in conjunction with the preferred embodiments thereof with reference to the accompanying drawing, in which.

DETAILED DESCRIPTION OF THE INVENTION

Figure 1:
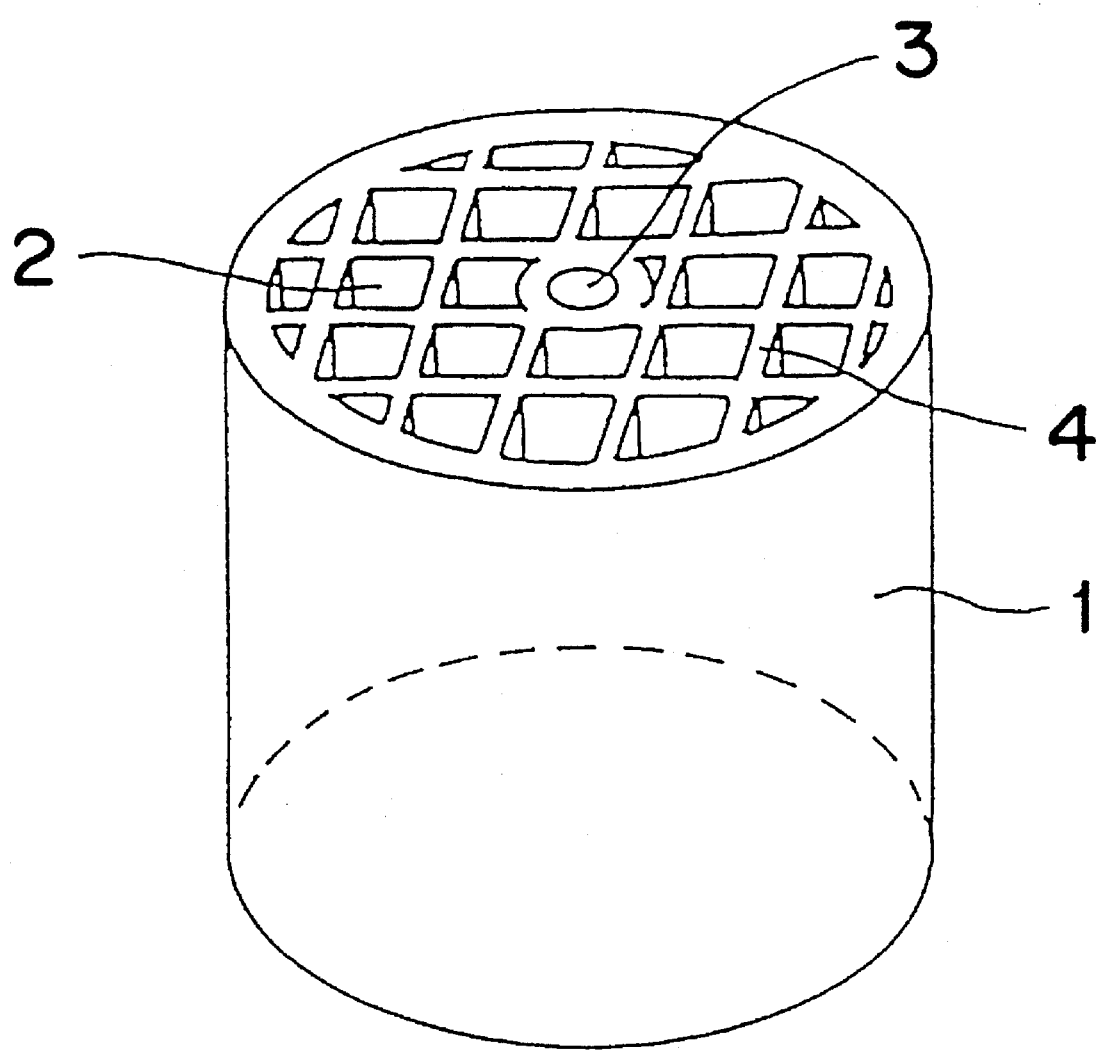
FIG. 1 is a perspective view showing an outline of an adsorptive honeycomb-shaped ceramic structure according to an embodiment of the present invention.

Hereinafter, the present invention will be explained in further detail by using examples.

EXAMPLE 1

An adsorptive honeycomb-shaped ceramic structure as shown in FIG. 1 (diameter 5 cm, height 10 cm) was produced in the following manner:

First, there was prepared a composition comprising 64 parts by weight of zeolite powder, 21 parts by weight of sepiolite fiber (commercialized product, made by Mizusawa Kagaku Co., diameter 0.01 μm, fiber length 3 μm), and 15 parts by weight of colloidal silica (solid content about 10 %). As to the zeolite powder, one known as SILTON B (trade name, made by Mizusawa Kagaku Co.) having a composition of [$Na_2O:SiO_2:Al_2O_3$=1:2:1 (molar ratio)] was pulverized into an average particle size of 0.6 μm for use.

Next, the composition (10 kgs.) was supplied, at an extrusion rate of 50 cm/min, to an extrusion molding machine having an extrusion die constituted so that the extrusion shape becomes a columnar cross structure with a plurality of holes 2 as shown in FIG. 1. The resulting molding product was allowed to stand at room temperature for natural drying for about 24 hours. Next, the molding product was placed standstill in a burning furnace (electric furnace), and the temperature was elevated, at a temperature raising rate of 2° C. min to 500° C., at which temperature the molding product was baked for 1 hour. Thereafter, the electric supply to the burning furnace was stopped and the furnace was cooled to room temperature with the molding product left in the furnace, in order to get the adsorptive honeycomb-shaped ceramic structure 1 of the present invention as shown in FIG. 1. The ceramic structure was one in which the zeolite powder and sepiolite fiber were uniformly dispersed and retained in the colloidal silica.

Using said ceramic structure as a honeycomb rotor for the microwave dryer, the air having the absolute humidity of 0.010–0.015 kg/kg' (kg' denotes dry air amount) was dehumidified continuously for 12 hours, by which there was obtained stably dry air 70–90 % dehumidified. The conditions of use of the rotor at that time were as follows:

Temperature of air to be dried: 40°–50° C.

Temperature of heated and regenerated air: 230°–250° C.

Temperature of cooling air: 40°–50° C.

Rotor rotation speed: 3 turns/hour

The above ceramic structure showed no falling off or degradation of zeolite, unlike the conventional honeycomb rotor made by securely depositing zeolite, and it had no lowering of dehumidifying capacity, even after use for 700 days at rate of continuous use for about 12 hours a day.

EXAMPLE 2

Except that 600° C. was adopted as the baking temperature for making the extrusion molding product, an adsorptive honeycomb-shaped ceramic structure of the present invention was made in the same way as in Example 1. The said ceramic structure also displayed excellent dehumidifying capacity as that of Example 1.

As described in Examples 1 and 2, the present invention makes it possible to provide an adsorptive honeycomb-shaped ceramic structure having excellent dehumidifying capacity at a relatively high temperature of 50°–100° C.

Further, according to the method of the present invention, it is possible to provide a highly durable drying agent, easily and at a low cost, which is suitable in repeated use for reviving itself by heating and for cooling, by extruding it into a honeycomb structure, with a large surface area, which displays excellent dehumidify capacity at such a temperature.

EXAMPLE 3

An adsorptive honeycomb-shaped ceramic structure as shown in FIG. 1 (diameter 10 cm, height 20 cm) was produced in the following manner:

First, there was prepared a zeolite-containing composition comprising 40 parts by weight of zeolite powder, 1 part by weight of carbon fiber, 45 parts by weight of colloidal silica (solid content about 20 %), 11 parts by weight of sepiolite, and 3 parts by weight of methyl cellulose. As the zeolite powder, a product known as SILTON B (commercialized product, made by Mizusawa Kagaku Co.) [$Na_2O:SiO_2:Al_2O_3$=1:2:1 (molar ratio)] (average particle diameter 0.6 μm) was used.

Next, the composition (10 kgs.) was supplied, at an extrusion rate of 200 cm/min, to an extrusion molding machine having an extrusion die constituted so that the extrusion shape becomes a columnar cross structure with a plurality of holes 2 as shown in FIG. 1. The resulting molding product was heated by a microwave for drying. Next, the molding product was placed standstill in a baking furnace (electric furnace), and the temperature was elevated, at a temperature raising rate of 2° C./min., to 500° C., at which temperature the molding product was baked for 1 hour. Thereafter, the electric supply to the baking furnace was stopped and the furnace was cooled down to a room temperature with the molding product left in the furnace, in order to get the adsorptive honeycomb shaped ceramic structure 1 of the present invention as exemplified in FIG. 1. The ceramic structure thus made was one in which the zeolite powder and carbon fiber were uniformly dispersed and retained in the colloidal silica, and which had an excellent mechanical strength.

Next, the dehumidifying capacity and durability of the ceramic structure were evaluated in the same manner as in the above Example 1.

Using said ceramic structure as a honeycomb rotor for the microwave dryer, the air having the absolute humidity of 0.010–0.015 kg/kg' was dehumidified continuously for 12 hours. As a result, there was obtained stably dry air 70–99 % dehumidified. The conditions of use of the rotor were as follows:

Temperature of air to be dried: 40°–50° C.

Temperature of heated and regenerated air: 200–250° C.

Temperature of cooling air: 40–50° C.

Rotor rotation speed: 10 turns/hour

The above ceramic structure showed no falling off or degradation of zeolite, unlike the conventional honeycomb rotor made by securely depositing zeolite, and it had no lowering of dehumidifying capacity, even after the use for 700 days at the rate of the continuous use for about 12 hours a day.

The results of these experiments are shown together with the mixing rates of raw materials and molding conditions in Table 1. In Table 1, the mixing proportions based on the foregoing moisture content (part by weight) are shown in the values converted to the solid content basis (% by weight).

TABLE 1

|  | Example | | | | | | Comparative Example | |
|---|---|---|---|---|---|---|---|---|
| Example No. | 3 | 4 | 5 | 6 | 7 | 8 | 1 | 2 |
| Composition *[1] | | | | | | | | |
| Zeolite powder | 65 | 65 | 65 | 65 | 65 | 65 | 80 | 65 |
| Fiber: | | | | | | | | |
| Carbon fiber | 2 | — | — | — | 2 | — | — | — |
| Si. carb. fiber | — | 2 | — | — | — | 2 | — | — |
| Pot. titanate f. | — | — | 2 | — | — | — | — | — |
| Stain. steel fib. | — | — | — | 2 | — | — | — | — |
| Binder: | | | | | | | | |
| Colloid. sil (sld.) | 15 | 15 | 15 | 15 | 15 | 15 | 20 | 15 |
| Sepiolite | 18 | 18 | 18 | 18 | — | — | — | 20 |
| Kaolinite | — | — | — | — | 18 | 18 | — | — |
| Mold. cond. | | | | | | | | |
| Baking temper. (°C.) | 500 | 500 | 500 | 500 | 500 | 500 | 500 | 500 |
| Baking durat. (hr) | 1 | 1 | 1 | 1 | 1 | 1 | 1 | 1 |
| Property | | | | | | | | |
| Compres. strength*[2] | H | S | S | S | H | S | L | M |
| Dehumidifying rate | 70–99 | " | " | " | " | " | " | " |
| Durability*[3] | S | S | S | S | S | S | L | M |

Notes:
*[1] % by weight
*[2] H - very strong, S - strong, M - middle, L - weak
*[3] S: Even after use for 700 days by continuous use for about 12 hours a day, no falling off or degradation of zeolite is noticed.
M: After use for 700 days by continuous use for about 12 hours a day, cracks are formed, and falling off and degradation of zeolite occur.
L: After use for 2 days by continuous use for about 12 hours a day, cracks are formed, and falling off and degradation of zeolite occur.

EXAMPLES 4 to 6

Except that there were used, as the inorganic fibers, carbon silicate fiber (Example 2), potassium titanate fiber (Example 3) and stainless steel fiber (Example 4), and except that the mixing ratios and molding conditions are those as shown in Table 1, the adsorptive zeolite-containing honeycomb-shaped ceramic structure of the present invention was made in the same way as that shown in Example 3.

The resulting ceramic structure was subjected to evaluations on strength, dehumidifying capacity and durability, and the results are shown in Table 1.

EXAMPLES 7 and 8

Except that colloidal silica and kaolinite were adopted as the inorganic binders, the adsorptive zeolite-containing honeycomb-shaped ceramic structure of the present invention was made according to Examples 3 and 4.

The resulting ceramic structure was subjected to evaluation of strength, dehumidifying capacity and durability as in Example 1, and the results are shown in Table 1.

Comparative Example 1

Except that only colloidal silica was used as the inorganic binder and no inorganic fiber was used, a ceramic structure having the composition as shown in Table 1 was made in accordance with Example 1, and various properties of the resulting ceramic structure were evaluated. The results are shown in Table 1.

Comparative Example 2

Except that colloidal silica and sepiolite were adopted as the inorganic binders, a ceramic structure having the composition as shown in Table 1 was made in accordance with Comparative Example 1, and various properties of the resulting ceramic structure were evaluated. The results are shown in Table 1.

As apparent from Table 1, the adsorptive zeolite-containing honeycomb-shaped ceramic structure of the present invention is excellent in all respects of dehumidifying capacity, strength and durability in comparison with the ceramic structures of Comparative Examples 1 and 2 which do not contain inorganic fiber.

As described above, as shown in Examples 3 to 8, the present invention is to provide an adsorptive zeolite-containing honeycomb-shaped ceramic structure and a method for its production. According to the present invention, it is possible to provide an adsorptive zeolite-containing honeycomb-shaped ceramic structure having excellent adsorptivity and strength as well as high durability in repeated use for reviving itself by heating and for cooling, by employing a simple method of extrusion molding.

What is claimed is:

1. A method for producing an adsorptive honeycomb-shaped ceramic structure which comprises the steps of:

extruding a composition containing zeolite powder having a moisture adsorbing property, inorganic fiber, and inorganic binder into a honeycomb shape, drying the composition in the honeycomb shape, and baking the dried composition in the honeycomb shape at a temperature of 400°–700° C. for at least one hour.

2. The method according to claim 1, wherein the inorganic fiber is sepiolite fiber, and the inorganic binder is colloidal silica.

3. A method for producing an adsorptive honeycomb-shaped ceramic structure which comprises the steps of:

extruding a composition containing (a) zeolite powder having a moisture adsorbing property, (b) inorganic fiber which is at least one selected from the group consisting of: (i) non-oxide fiber selected from carbon fiber, silicon carbide fiber, boron carbide fiber and boron nitride fiber, (ii) oxide fiber selected from potassium titanate fiber, zirconia fiber and alumina-boronasilica fiber, and (iii) metal fiber selected from stainless steel fiber and steel fiber, and (c) inorganic binder, into a honeycomb shape, drying the composition in the honeycomb shape, and baking the dried composition in the honeycomb shape at a temperature of 400°–700° C. for at least 20 minutes.

4. The method according to claim 3, wherein the inorganic fiber is carbon fiber, and the inorganic binder is sepiolite and/or clay mineral, and colloidal silica.

5. The method according to claim 3, wherein the composition further contains an organic binder.

* * * * *